(12) United States Patent
Austin (10) Patent No.: US 9,341,863 B2
(45) Date of Patent: May 17, 2016

(54) EYEGLASS HINGE ASSEMBLY

(76) Inventor: Francis William Austin, Auckland (NZ)

(*) Notice: Subject to any disclaimer, the term of this patent is extended or adjusted under 35 U.S.C. 154(b) by 274 days.

(21) Appl. No.: 13/823,608

(22) PCT Filed: Nov. 30, 2011

(86) PCT No.: PCT/NZ2011/000249
§ 371 (c)(1),
(2), (4) Date: Mar. 14, 2013

(87) PCT Pub. No.: WO2012/074414
PCT Pub. Date: Jun. 7, 2012

(65) Prior Publication Data
US 2013/0242251 A1  Sep. 19, 2013

(30) Foreign Application Priority Data
Dec. 3, 2010 (NZ) ........................ 589698

(51) Int. Cl.
*G02C 5/22* (2006.01)
*G02C 5/16* (2006.01)
*G02C 1/08* (2006.01)
(Continued)

(52) U.S. Cl.
CPC ............... *G02C 5/2209* (2013.01); *G02C 1/08* (2013.01); *G02C 5/02* (2013.01); *G02C 5/146* (2013.01); *G02C 5/16* (2013.01); *G02C 2200/08* (2013.01)

(58) Field of Classification Search
CPC ............ G02C 5/229; G02C 5/14; G02C 5/16
USPC .................. 351/111, 114–116, 121, 153
See application file for complete search history.

(56) References Cited

U.S. PATENT DOCUMENTS

| 2,379,928 A | * | 7/1945 | Rosenheim | 351/83 |
| 2,671,379 A | * | 3/1954 | Eloranta | 351/111 |
| 2,933,016 A | * | 4/1960 | Kunde et al. | 351/116 |

(Continued)

FOREIGN PATENT DOCUMENTS

| CN | 201477307 | 5/2010 |
| CN | 201489213 | 5/2010 |

(Continued)

OTHER PUBLICATIONS

International Search Report mailed Feb. 12, 2012, in connection with International Application No. PCT/NZ2011/000249, filed Nov. 30, 2011.

(Continued)

*Primary Examiner* — Darryl J Collins
(74) *Attorney, Agent, or Firm* — Nixon & Vanderhye P.C.

(57) ABSTRACT

The invention relates to a hinge for connecting a temple arm to an eyeglass frame that may be made up of one or more frame parts. Parts of the eyeglasses, including the temple arm and frame, are interchangeable so the colour, shape and style of eyeglasses can be quickly and easily changed. The temple arm is connected to the frame securely, but in a way that the temple arm can easily be disconnected for interchanging. The temple arm needs to be deformed, bent or moved beyond a normal orientation to allow it to be easily disconnected. In a preferred embodiment, the temple arm hinge assembly comprises a hooked member and a pivot shaft, whereby the pivot shaft comprises a notch or truncation positioned such that the hooked member can only be engaged/disengaged if the temple arm is deformed or the like beyond a normal position.

17 Claims, 10 Drawing Sheets

(51) Int. Cl.
*G02C 5/02* (2006.01)
*G02C 5/14* (2006.01)

(56) References Cited

U.S. PATENT DOCUMENTS

| | | | |
|---|---|---|---|
| 3,458,866 | A | 8/1969 | DeMan |
| 4,153,347 | A | 5/1979 | Meyer |
| 5,398,377 | A | 3/1995 | Takiyama |
| 5,418,581 | A | 5/1995 | Conway |
| 5,791,015 | A * | 8/1998 | Wandinger ............ G02C 5/2209 16/228 |
| 5,898,471 | A | 4/1999 | Simioni et al. |
| 6,099,120 | A | 8/2000 | De Lima |
| 6,438,798 | B1 * | 8/2002 | Chene et al. ................ 16/335 |
| 7,029,115 | B2 | 4/2006 | Toulch |
| 7,712,894 | B2 | 5/2010 | Tsai |
| 2003/0067584 | A1 | 4/2003 | Mauri |
| 2005/0151925 | A1* | 7/2005 | Chen ................ G02C 1/08 351/90 |
| 2005/0259218 | A1 | 11/2005 | Habermann |
| 2006/0139567 | A1 | 6/2006 | Toulch |
| 2009/0279047 | A1 | 11/2009 | Tsai |

FOREIGN PATENT DOCUMENTS

| | | |
|---|---|---|
| DE | 19629491 | 1/1998 |
| EP | 0495767 | 7/1992 |
| GB | 389036 | 3/1933 |
| GB | 734208 | 7/1955 |
| GB | 2385942 | 9/2003 |
| JP | U-55-008944 | 7/1978 |
| JP | U-57-201513 | 6/1981 |
| JP | A-2002-268017 | 9/2002 |
| JP | A-2003-215506 | 7/2003 |
| WO | 95/13558 | 5/1995 |
| WO | WO 2011/149364 A1 | 12/2011 |

OTHER PUBLICATIONS

Nov. 6, 2015 Extended European Search Report issued in European Application No. 11844029.6.

\* cited by examiner

EYEGLASS HINGE ASSEMBLY

CROSS-REFERENCE TO RELATED APPLICATIONS

This application is a §371 national stage entry of International Application No. PCT/NZ2011/000249, filed Nov. 30, 2011, which claims priority to New Zealand Patent Application No. 589698 filed Dec. 3, 2010, the entire contents of which are incorporated herein by reference.

FIELD OF INVENTION

The invention relates to an eyeglass hinge assembly. More particularly, the invention relates to a hinge for detachably connecting a temple arm to an eyeglass frame.

BACKGROUND TO THE INVENTION

A huge number of the world's population wears eyeglasses in some form. The term "eyeglasses" generally refers to a device in which lenses are worn in front of the eyes, including but not limited to: spectacles for vision correction; sunglasses for solar protection and safety glasses for eye protection.

Eyeglasses generally comprise a frame for bearing the optically transparent lenses and positioning them appropriately in front of the eyes of the wearer. The frame of eyeglasses generally comprises at least some of the following components: rims to which the lenses are attached; arms or temples which are placed over the ears of the wearer; and a bridge which connects the two lenses (or their rims) together. Part of the frame, typically but not always the bridge, is adapted to rest on the nose of a wearer.

Eyeglasses have evolved over the years from being a purely functional item to being a fashion accessory. The style of eyeglasses has evolved accordingly, in terms of their shape, size and colour. Nowadays, people often desire to have more than one pair of eyeglasses to suit use in different situations, to complement different outfits or simply for the sake of variety. However, the high price of eyeglasses prevents this being a practicable option for many people.

One way in which the style of eyeglasses can be varied relatively cheaply is with interchangeable parts. For example, US 2006/0139567 describes eyeglasses having detachable temple arms so they can be changed by a user. The temples disclosed in this document include recesses that can rotate around pins on lens connectors. U.S. Pat. No. 7,029,115 discloses similar eyeglasses to US 2006/0139567. A temple arm is detachable from pins on lens connectors upon relative motion of the temple arm parallel to the temple arm or in a direction less than 45° to it. The temple arm can be detached from the rest of the eyeglasses when the temple arm is in any configuration, provided a force is applied in the appropriate direction. In both these documents, the pins of the lens connectors need to be deformed to be both inserted into the recesses (to connect the temple arms) and removed from the recesses (to remove the temple arms). This makes connecting and removing the temple arms a fiddly task and the need to deform the pins means they are susceptible to breakage. Even so, the ability to disconnect temple arms when they are in any configuration may result in accidental disconnection.

In other prior art temple interchange systems, the temple arms can become detached too easily, which is clearly undesirable.

WO 95/13558 describes eyeglasses having interchangeable lenses for varying the type of lens according to the requirements of the situation, for example for long distance or short distance viewing, or for protecting from the glare of the sun. The lenses may also be used with eyeglass frame parts of a different colour or style.

U.S. Pat. No. 7,712,894 discloses eyeglasses with detachable temple arms and a slit in the frames proximate the point of connection with the temple arms to allow the lenses to easily be removed. The slit is formed between two parts of the frames that each has a pivot pin for engaging with a hooked part of the temple arm to allow rotation of the temple arm. The temple arm is detachable from the frame upon movement of the temple arm relative to the frame so that the pivot pin slides along a slot in the temple arm and can pass through an opening. In the closed or folded configuration, the temple arms can be very easily detached from the frames, which may be undesirable.

Other known eyeglasses have temple arms attached to the frames by means of small screws. These are prone to becoming loose, requiring tightening with a small screwdriver. The need for screws adds an extra component and complexity to the manufacturing process.

These prior art systems do provide some ability to change the style and colour of eyeglasses, but the degree of customisation that is possible is limited. For example, the ability to change the bridge and temple arms only allows the style of eyeglasses to be changed only to the extent allowed by changes in the style of those parts.

Furthermore, prior art eyeglass systems having interchangeable parts have been found to be weaker and more flimsy than is desirable for a product designed for long-term use. This is especially true at the join of interchangeable parts, such as where temple arms are pivotally connected to the frames or lenses.

OBJECT OF THE INVENTION

It is an object of the invention to provide an improved eyeglass hinge assembly or components thereof.

Alternatively, it is an object to overcome at least some of the aforementioned problems with the prior art.

Alternatively, it is an object of the invention to at least provide the public with a useful choice.

SUMMARY OF THE INVENTION

In general and non-limiting terms, the invention relates to a hinge for connecting a temple arm to an eyeglass frame that may be made up of one or more frame parts. Parts of the eyeglasses, including the temple arm and frame, are interchangeable so the colour, shape and style of eyeglasses can be quickly and easily changed. The temple arm is connected to the frame securely, but in a way that the temple arm can easily be disconnected for interchanging. The temple arm needs to be deformed, bent or moved beyond a normal orientation to allow it to be easily disconnected.

According to a first aspect of the invention, there is provided an eyeglass hinge assembly comprising a temple arm detachably connected to at least one frame part, the temple arm being pivotably moveable between open and closed positions, wherein the temple arm is deformable towards the at least one frame part when the temple arm is in the closed position to detach the temple arm from the at least one frame part.

In preferred embodiments, the temple arm is not detachable from the at least one frame part when in the closed position and the temple arm is detachable from the at least one frame part when deformed in the closed position towards the frame part.

Preferably, the at least one frame part comprises detachably connected upper and lower frame parts.

Preferably, the eyeglass assembly comprises a first hinge member and a second hinge member.

Preferably, the first hinge member comprises a pivot shaft.

Preferably, the second hinge member comprises a pivoting means. More preferably, the pivoting means comprises at least one hooked member adapted to allow rotation of the second hinge member around the pivot shaft of the first hinge member.

Preferably, the extent of the hooked member is such that the hooked member may only be disengaged from the pivot shaft upon deformation of the temple arm towards the at least one frame part.

Preferably, the pivot shaft comprises a truncation or notch positioned to ease engagement and/or disengagement of the at least one hooked member with the pivot shaft along a predetermined orientation of the second hinge member relative to the first hinge member.

More preferably, the notch is positioned in a side of the pivot shaft such that the notch receives an end of a first hooked member when the second hinge member is brought into engaging contact with the first hinge member.

More preferably, the truncation or notch is positioned to define the predetermined orientation of the second hinge member relative to the first hinge member such that the temple arm needs to be deformed towards the at least one frame part for the second hinge member to achieve the predetermined orientation. In said predetermined orientation, the end of the hooked member is positioned to slide past the truncation or notch to engage/disengage the temple arm and the at least one frame part.

Preferably, the second hinge member comprises a rotation-limiting portion. More preferably, the rotation-limiting portion of the second hinge member is adapted to abut a surface of the first hinge member to limit the rotation of the temple arm and define a fully open position.

Preferably, the eyeglass hinge assembly comprises first biasing means to bias the temple arm in a fully open position.

Preferably, the eyeglass hinge assembly comprises second biasing means to bias the temple arm in a fully closed position.

Preferably, the first hinge member comprises at least one notch and the second hinge member comprises a protrusion, the notch(es) being adapted to co-operate with the protrusion to bias the temple arm in the fully open and/or closed position.

In an alternative embodiment, the first hinge member comprises at least one protrusion and the second hinge member comprises a notch, the notch being adapted to co-operate with the protrusion(s) to bias the temple arm in the fully open and/or closed position.

The invention concerns a hinge assembly for eyeglasses comprising two hinge members that are detachably connected. It will be understood by those skilled in the art that the invention is independent of which eyeglass components comprise which co-operating features of the hinge assembly. For example, the temple arm or the at least one frame part may comprise the pivot shaft, with the other comprising the co-operating pivoting means.

Preferably, the at least one frame part comprises the first hinge member and the temple arm comprises the second hinge member.

In an alternative embodiment, the at least one frame part comprises the second hinge member and the temple arm comprises the first hinge member.

Preferably, the pivot shaft comprises an upwardly projecting portion and a downwardly projecting portion.

Preferably, the upwardly projecting portion and the downwardly projecting portion of the pivot shaft are of unitary construction.

Preferably, the upper frame part comprises the pivot shaft.

Preferably, the lower frame part comprises a pivot shaft receiving portion adapted to receive the downwardly projecting portion of the pivot shaft such that, when the upper and lower frame parts are connected, the pivot shaft extends downwards from the pivot shaft receiving portion.

Preferably, the upper and lower frame parts are detachably connected by co-operating male and female portions. More preferably, the co-operating male and female portions may comprise the pivot shaft and pivot shaft receiving portion.

Preferably, the second hinge member comprises upper and lower hooked members adapted to co-operate with the upwardly projecting portion and downwardly projecting portion of the pivot shaft respectively.

According to a second aspect of the invention, there is provided a pair of eyeglasses having two temple arms, each pivotally connected to at least one frame part and moveable between fully open and closed positions, each temple arm being slideably disengagable from the at least one frame part when a portion of each temple arm is forced to an orientation beyond an orientation of the temple arm in the fully open or closed position.

According to a third aspect of the invention, there is provided an eyeglass hinge assembly connecting a temple arm to at least one frame part such that the temple arm is pivotably moveable between open and closed positions, the eyeglass hinge assembly comprising a first hinge member and a second hinge member, the first hinge member comprising at least one notch and the second hinge member comprising at least one protrusion, the notch(es) being adapted to co-operate with the protrusion(s) to bias the temple arm in the open and/or closed position.

According to a fourth aspect of the invention, there is provided an eyeglass temple arm adapted to be used in an eyeglass hinge assembly according to the first and/or third aspects of the invention.

According to a fifth aspect of the invention, there is provided one or more eyeglass frame parts adapted to be used in an eyeglass hinge assembly according to the first and/or third aspects of the invention.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which.

DETAILED DESCRIPTION OF PREFERRED EMBODIMENTS OF THE INVENTION

Figure 1:
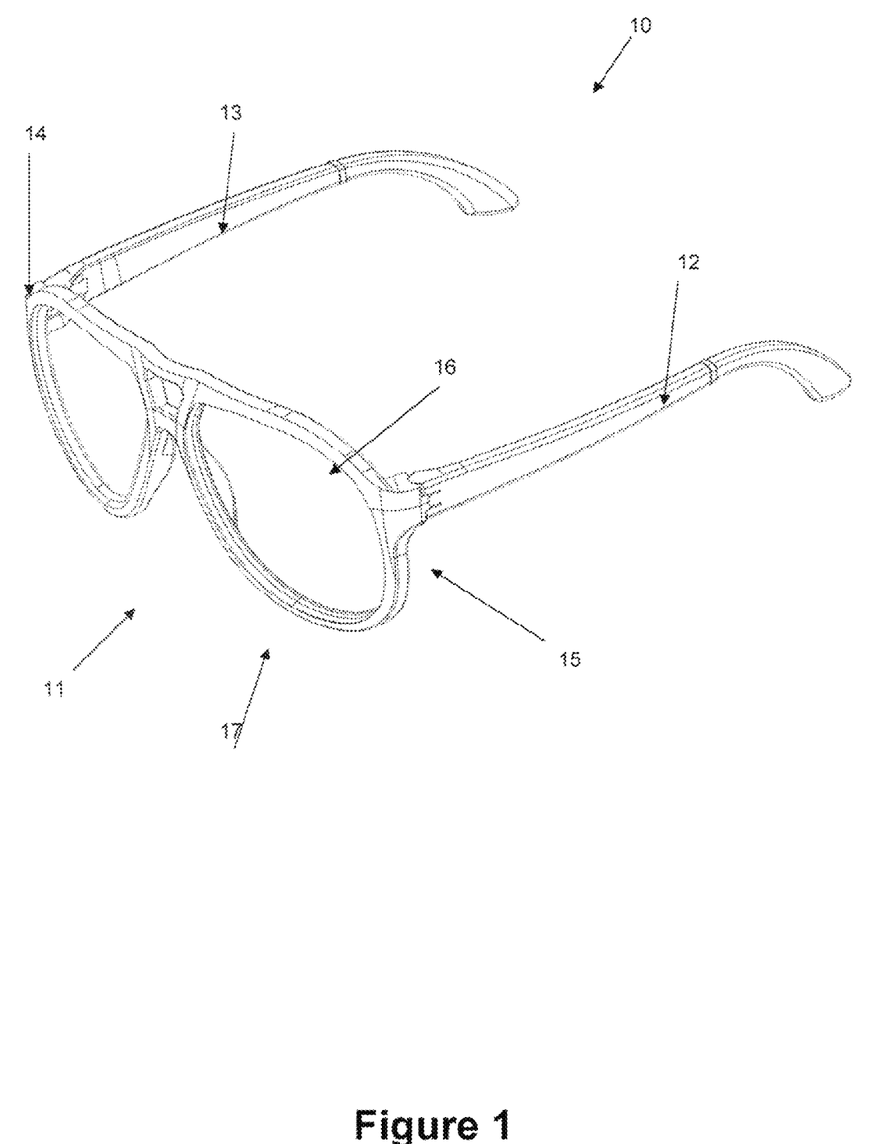
FIG. 1 is a isometric view illustration of an eyeglass assembly according to an embodiment of the invention.

FIG. 1 is a isometric view illustration of an eyeglass assembly 10 according to an embodiment of the invention. Assembly 10 comprises a frame 11 and temple arms 12, 13 (shown in an open configuration in FIG. 1). Frame 11 comprises lens receiving portions adapted to receive eye lenses.

Temple arms 12, 13 are pivotally connected to frame 11 by means of hinge assemblies or connections 14, 15. Hinge connections 14, 15 allow rotational movement of temple arms 12, 13 relative to frame 11. In FIG. 1, temple arms 12, 13 are shown in an open or unfolded position allowing the eyeglass assembly to be placed on a wearer's face. The temple arms may also be closed or folded to store the eyeglasses, for example. At the extremes of movement of temple arms 12, 13, they are in the fully open and closed positions. The fully open and closed positions may be defined through movement limiters. For example, in some embodiments, the temple arms are closed to the extent that they come into contact with frame 11, which defines the fully closed position. In other embodiments, hinge connections 14, 15 comprise rotation limiting portions, examples of which will be described in more detail below, to define the fully open and/or closed positions.

Temple arms 12, 13 are detachably connected to frame 11. Being able to detach the temple arms allows them to be interchanged with other temple arms so the style, colour and/or shape of the eyeglasses can be modified to suit user requirements. Frame 11, or portions thereof, may also be interchanged with like components.

In the embodiment shown in FIG. 1, temple arms 12, 13 are difficult to disconnect in normal use, that is, without using extreme and potentially damaging force, therefore they are securely connected during normal use. When in the closed position, each temple arm may be disconnected from frame 11 by deforming or bending each arm in the direction of frame 11. More generally, moving a temple arm beyond its normal orientation in the closed position may allow it to be disconnected. Bending a temple arm in such a way re-positions parts of the hinge assembly, as will be described in more detail below, so that the temple arm and frame can slide apart with relative ease. During normal use of a pair of eyeglasses a temple arm is unlikely to be deformed in such a way, therefore the temple arms are unlikely to fall off during normal use.

In the preferred embodiment shown in FIG. 1, frame 11 comprises an upper frame part 16 and a lower frame part 17. Upper frame part 16 is detachably connected to lower frame part 17. In one embodiment, the upper and lower frame parts are connected by means of co-operating male and female friction fit portions. In other embodiments, other means of detachably connecting the upper and lower frame parts are used and it will be understood that the invention is not limited thereto. The upper and lower frame parts are preferably detachably connected so that reasonable force is required to separate them, that is, a user is able to pull them apart but they will not disconnect unintentionally during normal use.

In other embodiments, frame 11 may be of unitary construction or may be comprised of other configurations of frame parts.

Any suitable material may be used to form the constituent parts of an eyeglass hinge assembly according to the invention. FIGS. 2 to 6 illustrate one embodiment of the invention in which a plastics material is used to form the components shown.

Figure 2:
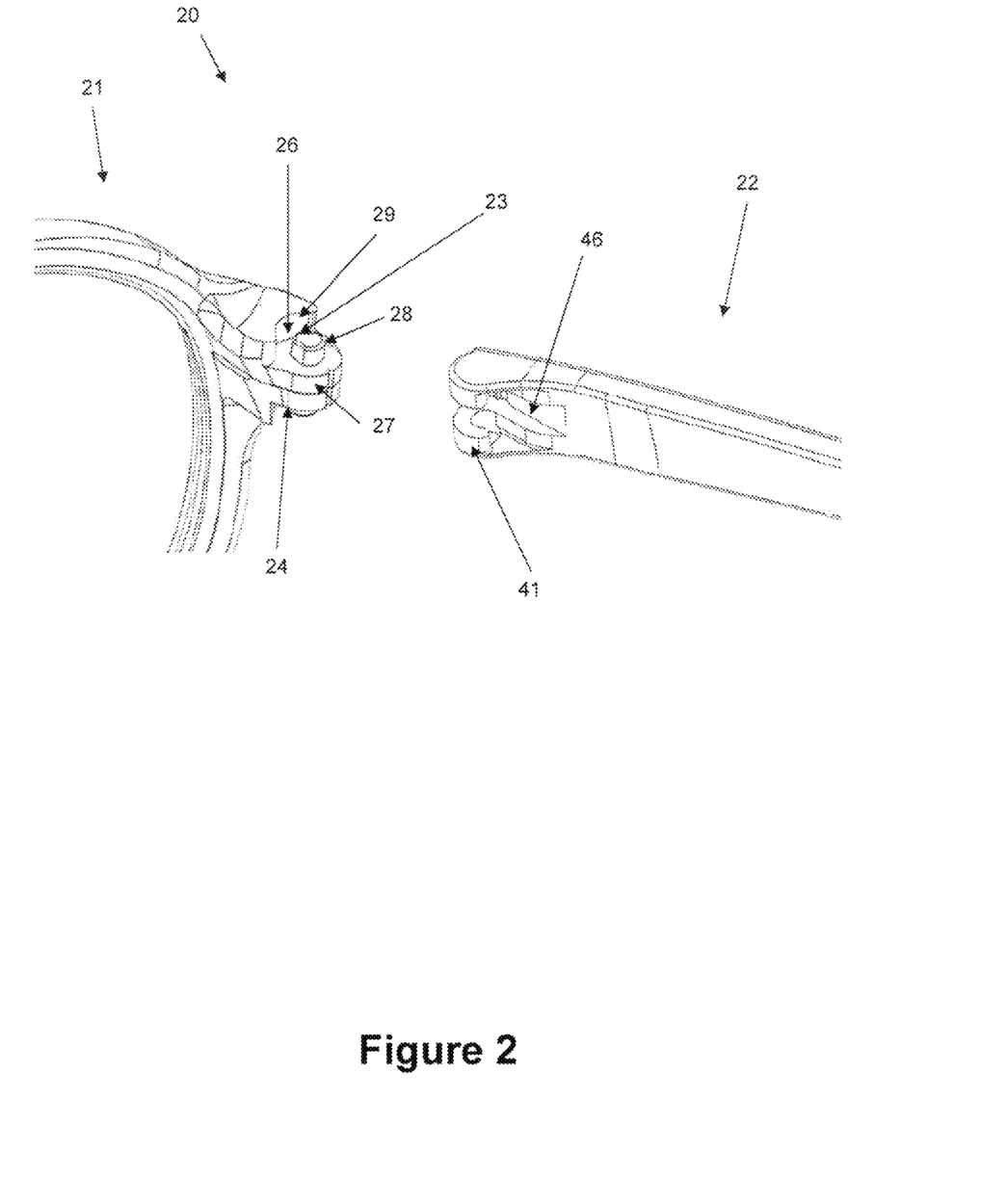
FIG. 2 is a isometric view of an eyeglass hinge assembly according to an embodiment of the invention.

FIG. 2 is a isometric view of an eyeglass hinge assembly 20 according to an embodiment of the invention. Hinge assembly 20 comprises a first hinge member 21 and a second hinge member 22, the hinge members being adapted to pivotally co-operate. In the preferred embodiment shown in FIG. 2, one or more frame parts of the eyeglasses comprises first hinge member 21 and a temple arm of the eyeglasses comprises second hinge member 22. However, in other embodiments, the one or more frame parts of the eyeglasses comprises second hinge member 22 and the temple arm comprises first hinge member 21. The invention concerns the hinge assembly and therefore is independent of which eyeglass component comprises which co-operating structure of the hinge assembly.

In the preferred embodiment of FIG. 2, the one or more frame parts make up the front face of the eyeglasses, and no portion of the temple arms comprises the front face. This may be desirable in some cases. However, it may be desirable in certain circumstances for one end of the temple arms to comprise part of the front face of the eyeglasses. In these circumstances, the one or more frame parts of the eyeglasses may comprise second hinge member 22 and the temple arm may comprise first hinge member 21.

It will be understood to those skilled in the art that the inventive principles of the present invention may be embodied in a number of ways. The embodiments described herein are not limiting to the invention. For example, by altering various aspects of the illustrative embodiments, differing styles, shapes and configurations of eyeglasses may be provided.

First Hinge Member

First hinge member 21 will now be described with reference to FIG. 2 and FIG. 3, which is a plan view illustration of one end of the first hinge member illustrated in FIG. 2. The end shown is the end that co-operates with the second hinge member.

First hinge member 21 comprises a pivot shaft 23. Pivot shaft 23 comprises upwardly and downwardly extending portions that extend upwards and downwards respectively from a limb 24 extending from one end of first hinge member 21. Pivot shaft 23 is positioned centrally with respect to limb 24. There is sufficient width between pivot shaft 23 and a rotation wall portion 25 defined by the extension of limb 24 from first hinge member 21 to permit a hooked member of the second hinge member (described below) to engage the pivot shaft and allow rotation of the second hinge member with respect to the first hinge member.

Figure 3:
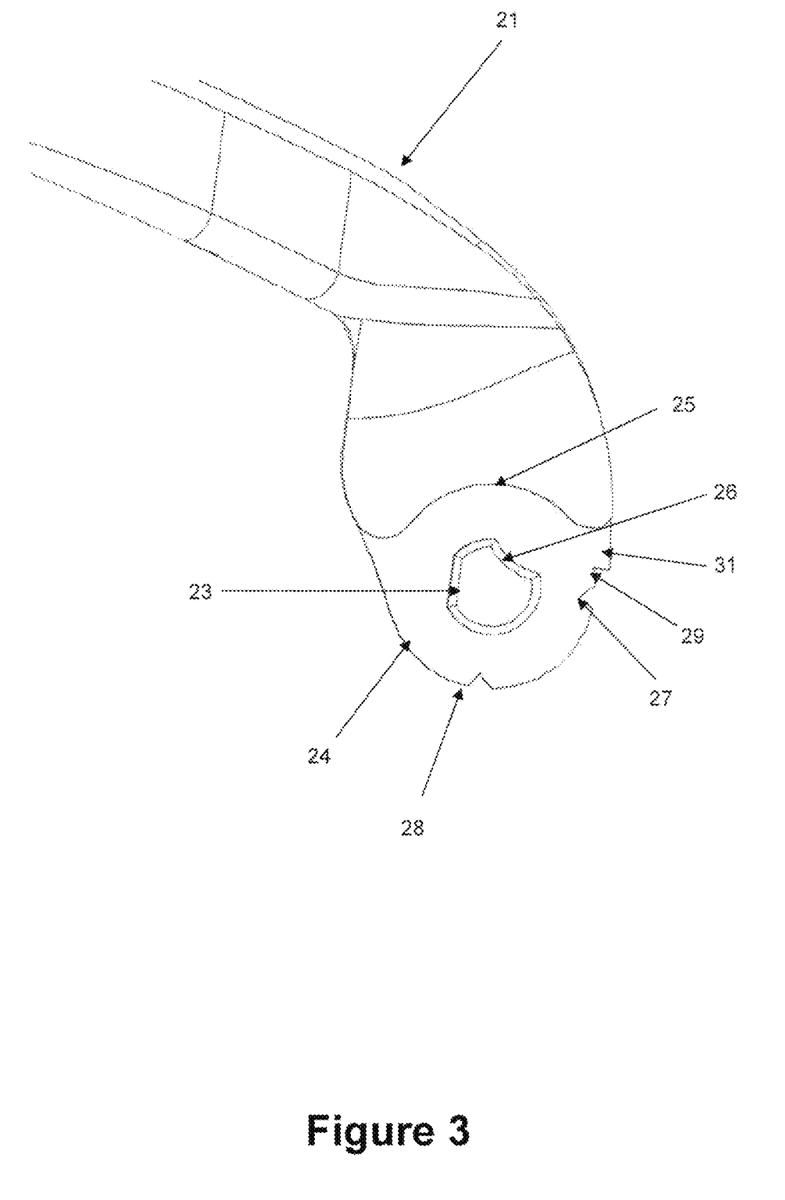
FIG. 3 is a plan view illustration of one end of the first hinge member illustrated in FIG. 2.

The pivot shaft may comprise at least one notch or scallop, such as notch 26 in the upwardly extending portion of pivot shaft 23 shown in FIGS. 2 and 3. A similarly sized and positioned notch is also provided in the downwardly extending portion. Notch 26 has the shape of an arc of a circle. In the case of the embodiment shown in FIG. 3, the circle has a radius slightly larger than the radius of pivot shaft 23. Other embodiments may comprise notches of different sizes and shapes.

Notch 26 is positioned on a surface of pivot shaft 23 facing the rotation wall portion 25. Notch 26 defines an orientation along which the width of pivot shaft 23 is narrower than in other orientations. This allows the second hinge member to engage with the first hinge member when the second hinge member is moved along this orientation. The exact position of the notch may vary according to the orientation at which the second hinge member is required to slide out of engagement from the first hinge member, and hence the ease by which the temple arm and frame part(s) can be disengaged. In the embodiment shown in FIG. 3, a line drawn between the ends of the arc defining notch 26 defines a 58° angle with a line parallel to straight edge 31 of first hinge member 21.

First hinge member 21 comprises at least one notch, for example notches 27 and 28 in the outer edge of limb 24. Notches 27 and 28 are adapted to co-operate with a protrusion on the second hinge member as will be described below. Notches 27 and 28 are preferably V-shaped, but may be shaped differently in other embodiments. The notches are shallow enough so that a small amount of force is required to move the protrusion of the second hinge member out of the notches.

First hinge member 21 comprises a surface or wall portion 29 adapted to abut a rotation-limiting portion of the second hinge member when the temple arm is in the fully open position. The end of rotation wall portion 25 nearest wall portion 29 may also abut a part of the second hinge member to limit its rotation.

Second Hinge Member

Figure 4:
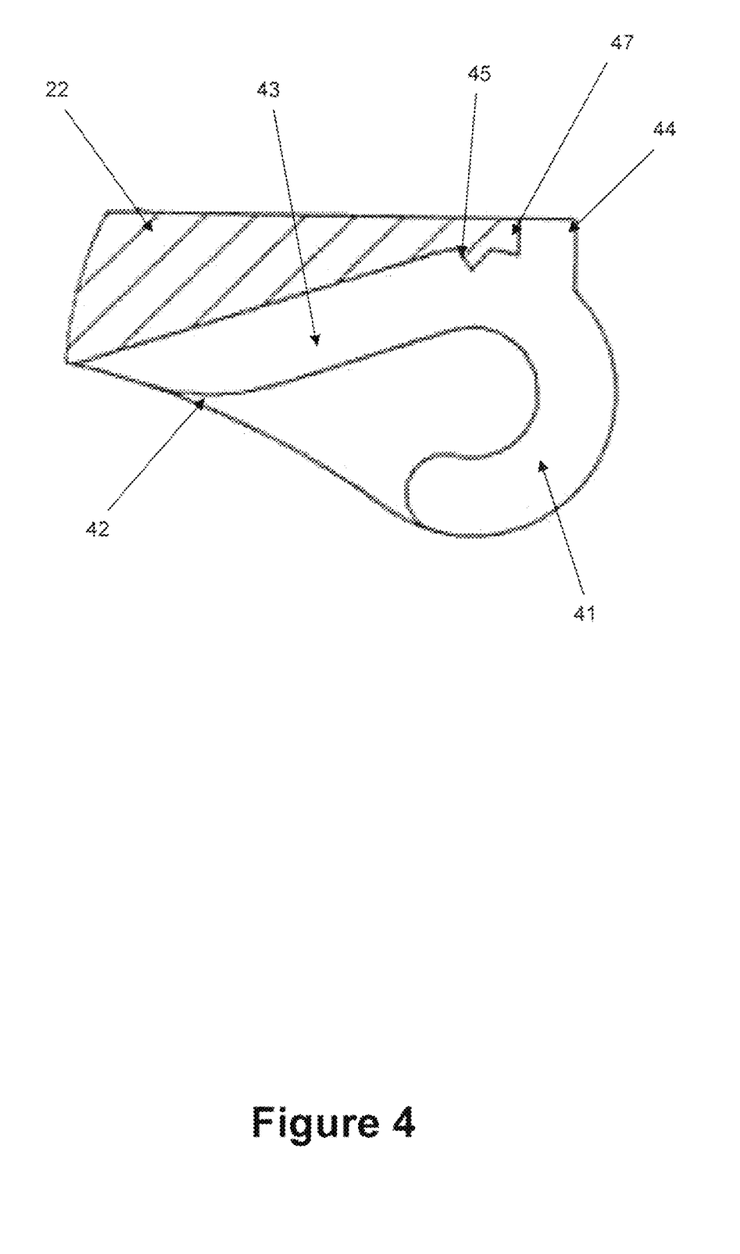
FIG. 4 is a cross-sectional plan view illustration of one end of the second hinge member illustrated in FIG. 2.

Second hinge member 22 will now be described with reference to FIG. 2 and FIG. 4, which is a cross-sectional plan view illustration of one end of the second hinge member illustrated in FIG. 2. The end shown is the end that co-operates with the first hinge member.

Second hinge member 22 comprises pivoting means adapted to pivot with respect to the pivot shaft of the first hinge member. For example, second hinge member 22 comprises at least one hooked member 41. The embodiment shown comprises upper and lower hooked members which co-operate with the upwardly and downwardly projecting portions of the pivot shaft respectively. Between the upper and lower hooked members is defined a channel adapted to receive limb 24 of first hinge member 21 and permit rotation thereof between the hooked members.

Hooked member 41 is adapted to co-operate with pivot shaft 23 and has a thickness that allows rotation of the second hinge member around the pivot shaft of the first hinge member. The radius of the part circle defined inside hooked member 41 is substantially similar to the radius of pivot shaft 23. In a preferred embodiment, the radius of the part circle defined inside hooked member 41 is slightly smaller than the radius of pivot shaft 23 so that the first and second hinge members rotate with respect to each other with a reasonable amount of friction so that the temple arm is not overly loose. A person of skill in the art will appreciate that the relative dimensions can be varied to suit requirements.

Hooked member 41 comprises a straight section 43 ending in a bump 42. In the embodiment shown in FIG. 4, straight section 43 defines an 18° angle with respect to the longitudinal axis of the second hinge member. This angle may vary in other embodiments, as will be described below.

Second hinge member 22 comprises a rotation-limiting portion to limit the extent of possible rotation between the first and second hinge members. In preferred embodiments, the rotation-limiting portion defines the fully open position of the temple arm relative to the frame. In such embodiments, the fully closed position is generally defined by contact of the temple arms with the frame. Other embodiments may comprise a further rotation-limiting portion to define the fully closed position. In the embodiment shown in FIG. 4, a tongue 46 positioned between the upper and lower hooked members ends in a side surface 47 which is adapted to abut wall portion 29 of first hinge member 21 in the open position to limit rotation of the temple arm. Furthermore, behind hooked member 41 is provided shoulder 44 which defines a flat side surface. In the fully open position, shoulder 44 is adapted to abut the end of rotation wall portion 25 of first hinge member 21 to limit rotation of the temple arm.

Second hinge member 22 comprises a protrusion 45 that is adapted to co-operate with notches 27, 28 of first hinge member 21. Protrusion 45 is shaped and sized sympathetically to the shape and size of notches 27 and 28 for co-operation therewith. In the embodiment shown, protrusion 45 is positioned on the inner side of a tongue 46 positioned between the upper and lower hooked members at or near the end of tongue 46.

Operation of Hinge Members

To connect the first and second hinge members shown in the embodiments hereinbefore described, the upper and lower hooked members of the second hinge member are brought into engaging contact with the upwardly and downwardly extending portions of pivot shaft 23 respectively. The notches in the pivot shaft, for example notch 26, are positioned to receive a part of the end of the hooked members 41. To enable the hooked members to fully hook around pivot shaft 23, the second hinge member is deformed or bent beyond a normal orientation during use, for example by applying force to a middle section of the second hinge member in the direction of the first hinge member. The deformation results in a portion of the second hinge member being forced to an orientation beyond a normal orientation when the hinge assembly is closed and the eyeglass temple arm abuts against the eyeglass frame. This has the effect of changing the angle of hooked member 41 and straight section 43 relative to pivot shaft 23 and notch 26. This change in angle allows the pivot shaft 23 to slide parallel to straight section 43 and fully co-operate with hooked member 41. Only when the second hinge member is deformed in this way can pivot shaft 23 fit between the ends of hooked members 41 and straight section 43 because the deformation aligns the orientation corresponding to the narrowest width of pivot shaft 23, by virtue of notch 26, with straight section 43.

Once engaged, first and second hinge members may freely rotate with respect to each other in between the open and closed limits defined by, for example, the rotation limiters described above and the temple arms abutting against the frame.

In the open position, protrusion 45 co-operates with notch 27, which helps bias the eyeglasses into the open position. Similarly, in the closed position, protrusion 45 co-operates with notch 28 to hold the eyeglasses in the closed position. These features are often desirable to prevent temple arms flapping around and to give a feeling of sturdiness to the eyeglasses.

Varying Parameters

It will be understood that changes in various parameters permit easier or harder engagement/disengagement of the first and second hinge members, as may be required. For example, the extent of hooked member 41 affects the ease with which the hooked member can be engaged and disengaged with the pivot shaft.

Furthermore, the angle of straight section 43 with respect to the longitudinal axis of the second hinge member determines the angle at which the first hinge member can be connected to the second hinge member since to engage with hooked member 41, pivot shaft 43 must slide parallel to straight section 43. A greater angle of straight section 43 with respect to the longitudinal axis of the second hinge member means a greater deformation of the second hinge member is required to engage/disengage the hinge members, therefore making the connection more secure and harder to connect or disconnect.

Figure 5:
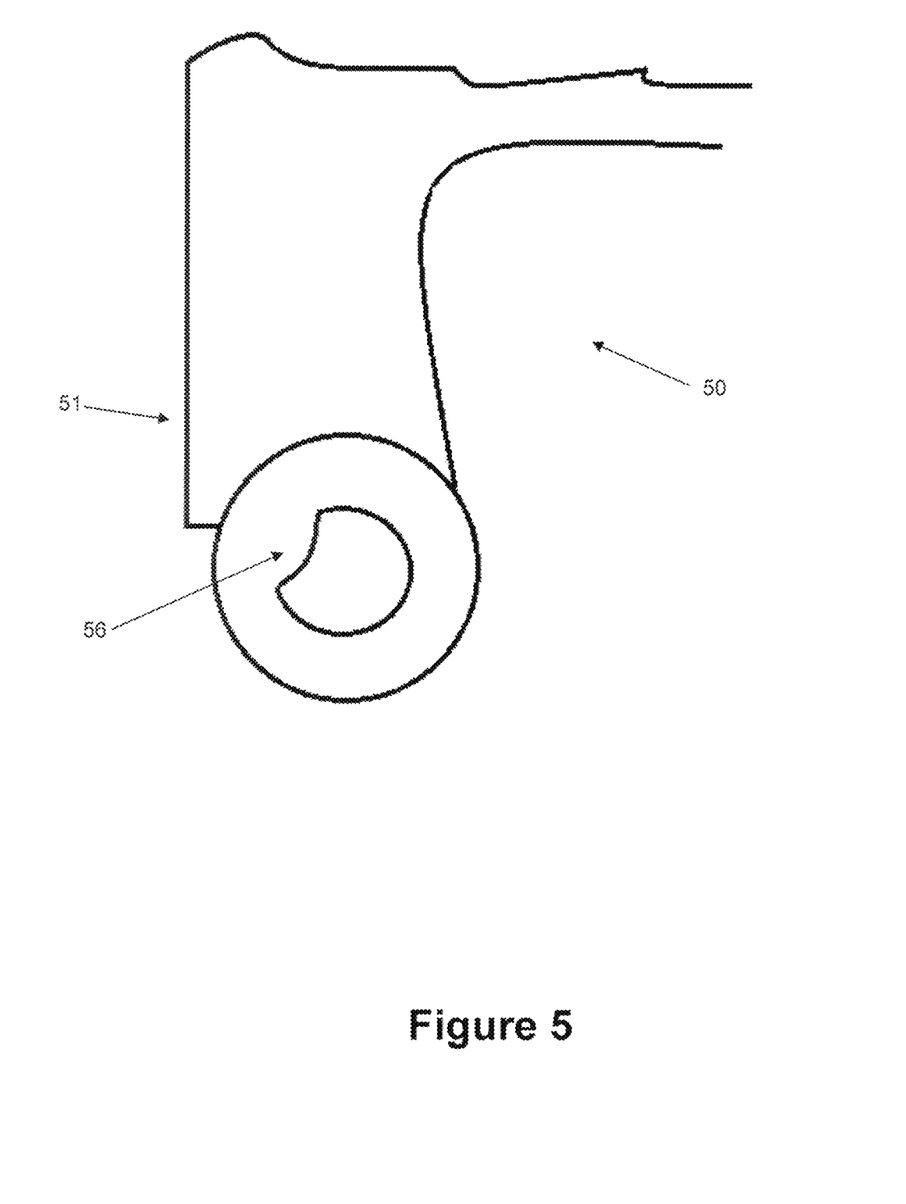
FIG. 5 is a plan view illustration of one end of a first hinge member according to an embodiment of the invention.

Similarly, the positioning of notch 26 on pivot shaft 23 also determines the degree of difficulty for connecting and disconnecting the hinge members. FIG. 5 is a plan view illustration of one end of a first hinge member 50 according to an embodiment of the invention. Notch 56 is positioned further around a pivot shaft of first hinge member 50 when compared to the position of notch 26 on first hinge member 21 shown in FIG. 3 (FIG. 5 illustrates the other end of an eyeglass frame to that shown in FIG. 3, hence the components are reversed). That is, the angle between a line connecting the ends of notch 56 and a line parallel to straight edge 51 of first hinge member 50 is smaller than the equivalent angle for hinge member 21.

As described above, first hinge member 21 comprises two notches 27, 28 and second hinge member 41 comprises protrusion 45. These are sized and shaped correspondingly and co-operate to bias the first hinge member and second hinge member in positions such that the temple arm is biased to the fully open or closed positions. The positioning of notches 27, 28 and/or protrusion 45 may be varied depending on the desired fully open/closed position of the temple arm. It will also be understood that the size and shape of the notches determine the degree of bias, and the amount of force required to move the temple arms away from the fully open or closed positions, and can be varied as required.

In another embodiment, the first hinge member may comprise a protrusion and the second hinge member may comprise notches to bias the position of the temple arm as described. Those of skill in the art will appreciate that the invention encompasses variations in which components of the first and second hinge members are interchanged.

Upper and Lower Frame Parts

As discussed in relation to FIG. 1, in preferred embodiments the frame of the eyeglass assembly comprises upper and lower frame parts. Such an embodiment will now be described in more detail in relation to FIG. 6, which is an exploded isometric view illustration of a frame 60 according to one embodiment of the invention.

Figure 6:
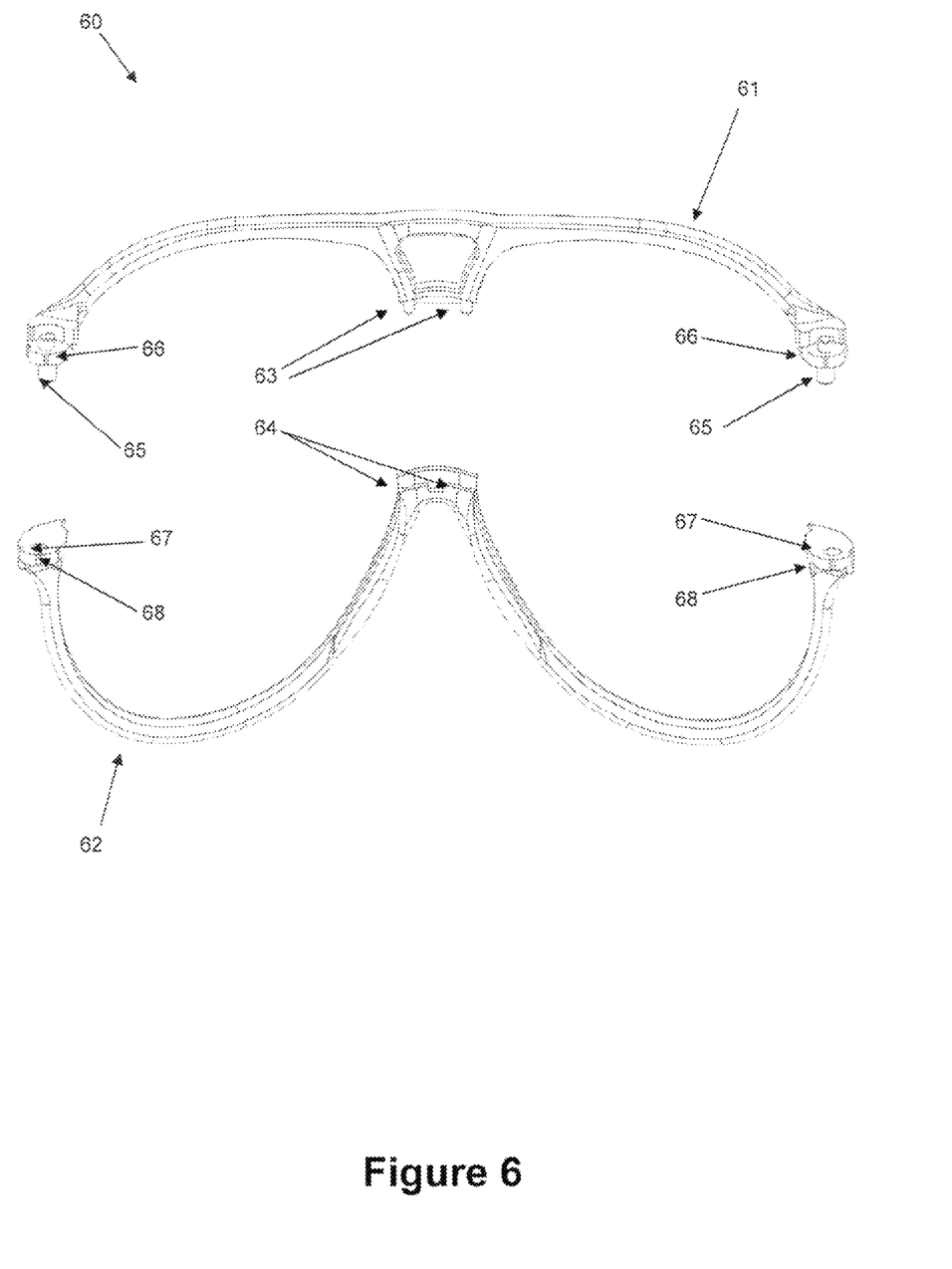
FIG. 6 is an exploded isometric view illustration of a frame according to one embodiment of the invention.

Frame 60 comprises upper frame part 61 and lower frame part 62, which are detachably connectable. For example, the frame parts are detachably connectable by means of male portions 63 co-operating with corresponding female portions 64. In other embodiments, other ways of detachably connecting the upper and lower frame parts are provided, such as will be apparent to those of skill in the art.

Frame 60 comprises pivot shaft 65 which, in the embodiment shown in FIG. 6, comprises upwardly and downwardly extending portions. Pivot shaft 65 is preferably of unitary construction with upper frame part 61 for ease of manufacture and strength. The upwardly and downwardly extending portions extend out of limb 66, with the downwardly extending portion of such length that, when positioned through a hole 67 in a limb 68 of lower frame part, it extends from limb 68 substantially the same amount as the upwardly extending portion extends from limb 66. When the upper and lower frame parts are connected, limbs 66 and 68 are positioned adjacently, with aligned edges.

It will be understood that embodiments in which the frame comprises upper and lower parts are not limited to the embodiment described above. In some embodiments, it is the lower frame part that comprises the pivot shaft, and upper frame part comprises a limb portion having a hole for receiving the pivot shaft. In still other embodiments, upper and lower frame parts comprise upwardly and downwardly extending parts of a pivot shaft, respectively.

Embodiments in which either the upper or lower frame part comprise the pivot shaft are generally preferred, because the friction fit of the pivot shaft through the hole in the limb of the frame part that receives the pivot shaft adds to secure the connection of the upper and lower frame parts.

Furthermore, the embodiment shown in FIG. 6, in which the upper frame part comprises the pivot shaft, provides the additional advantage because, when used in the context of eyeglasses in which the upper and lower frame parts are able to be interchanged with similar parts of different colours or shapes so that the style of eyeglasses can be altered, it is anticipated that the upper frame part will be changed more often. Therefore it is advantageous to have the lower frame part comprise those components that are least prone to wear. Since the male members and pivot shaft are vulnerable to becoming misshapen through use, and possibly snapping off, these are preferably comprised in the upper frame part.

Alternative Embodiments of the Invention

FIGS. 7 to 10 illustrate parts of an eyeglass hinge assembly according to a further embodiment of the invention. Only those parts relevant to the working of the hinge assembly are shown in the figures. It will be understood that the parts may be connected to or integrally formed with eyeglass components. The embodiment shown in FIGS. 7 to 10 is particularly suited to the use of a metallic material to form the components shown. Since metals and metal alloys used in the manufacture of eyeglasses are generally less deformable than plastics materials, some differences in the components compared to those discussed in relation to the embodiment of the invention shown in FIGS. 1 to 6 may be advantageous.

Figure 7:
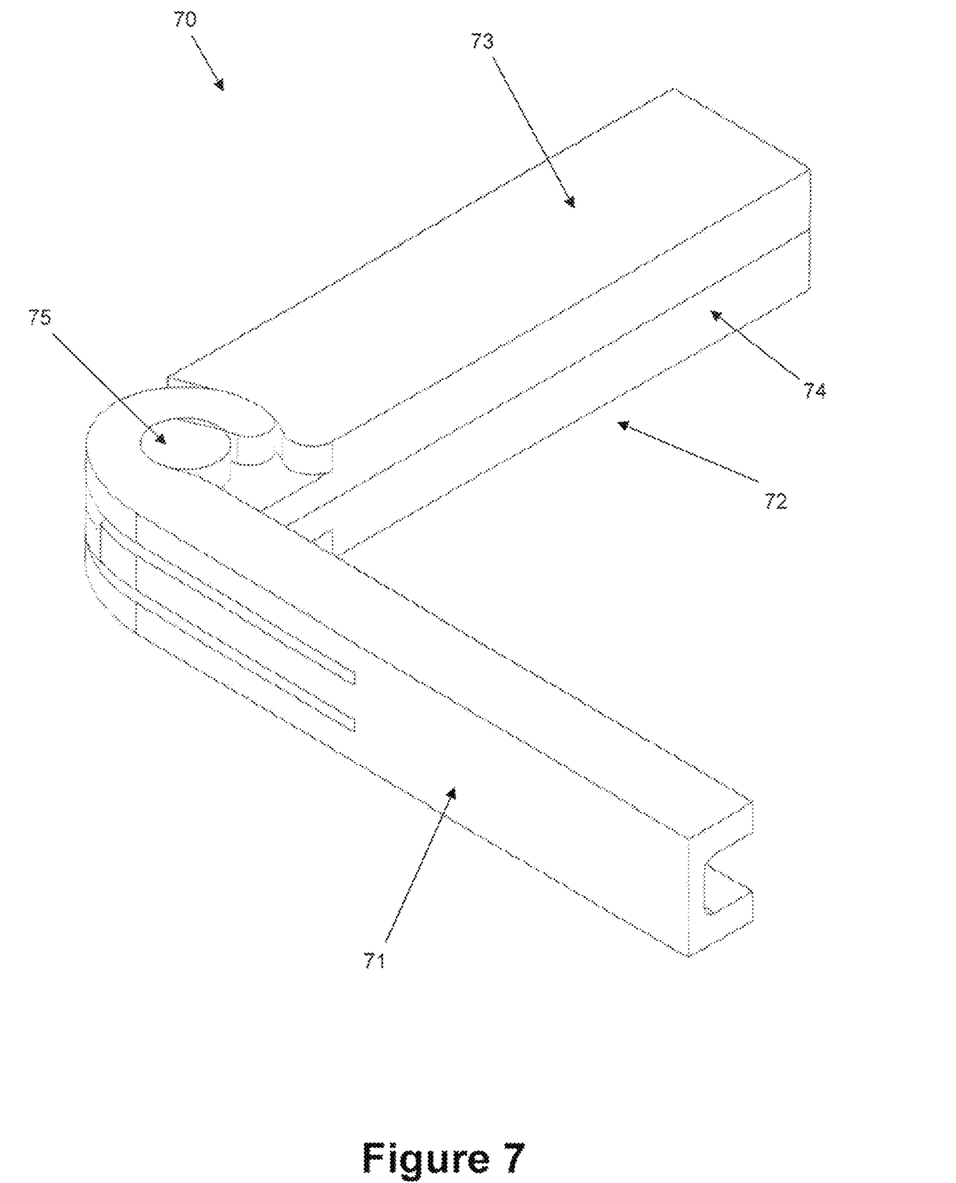
FIG. 7 is an isometric view illustration of parts of an eyeglass hinge assembly according to another embodiment of the invention.
Figure 8:
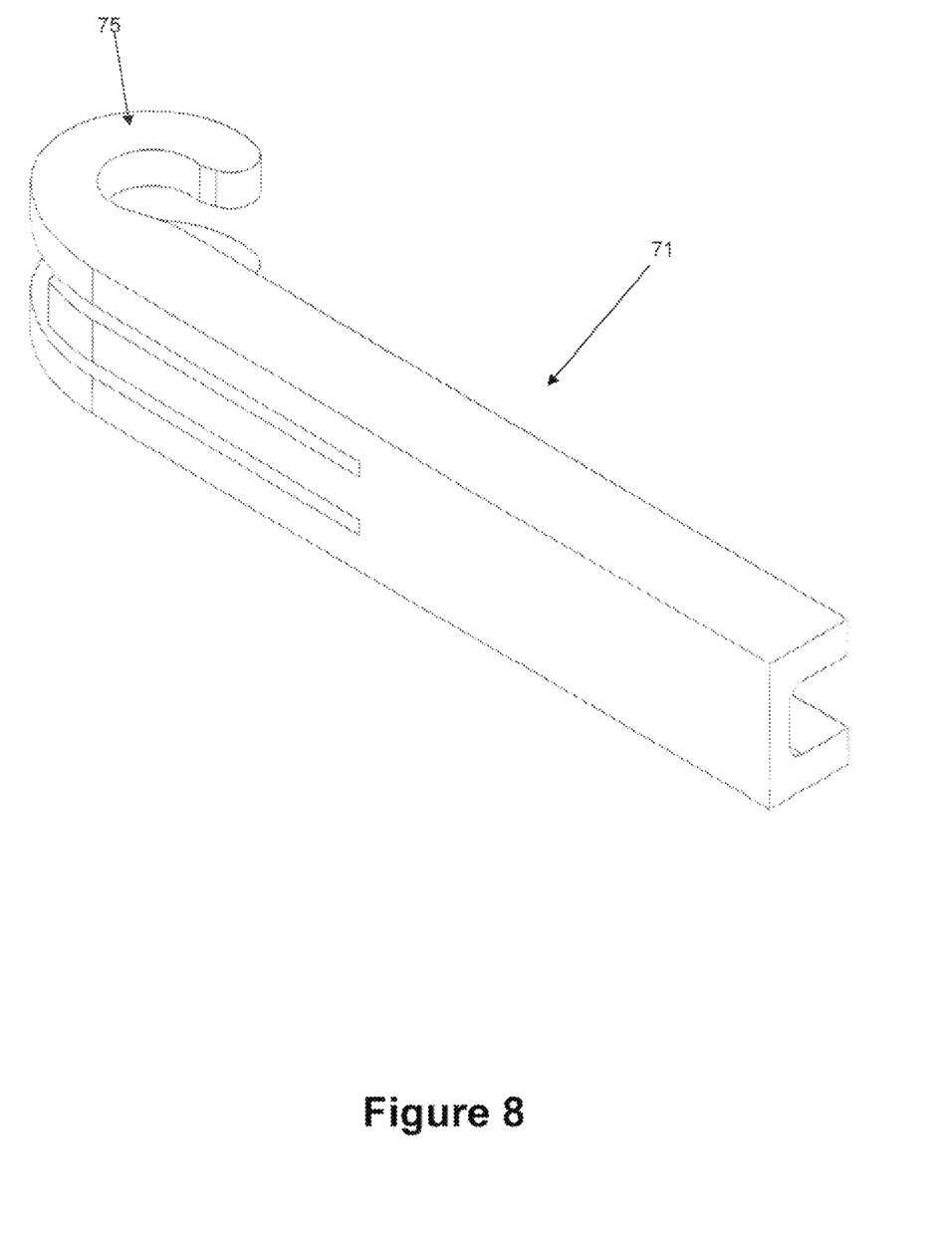
FIG. 8 is an isometric view illustration of the first hinge member illustrated in FIG. 7.
Figure 9:
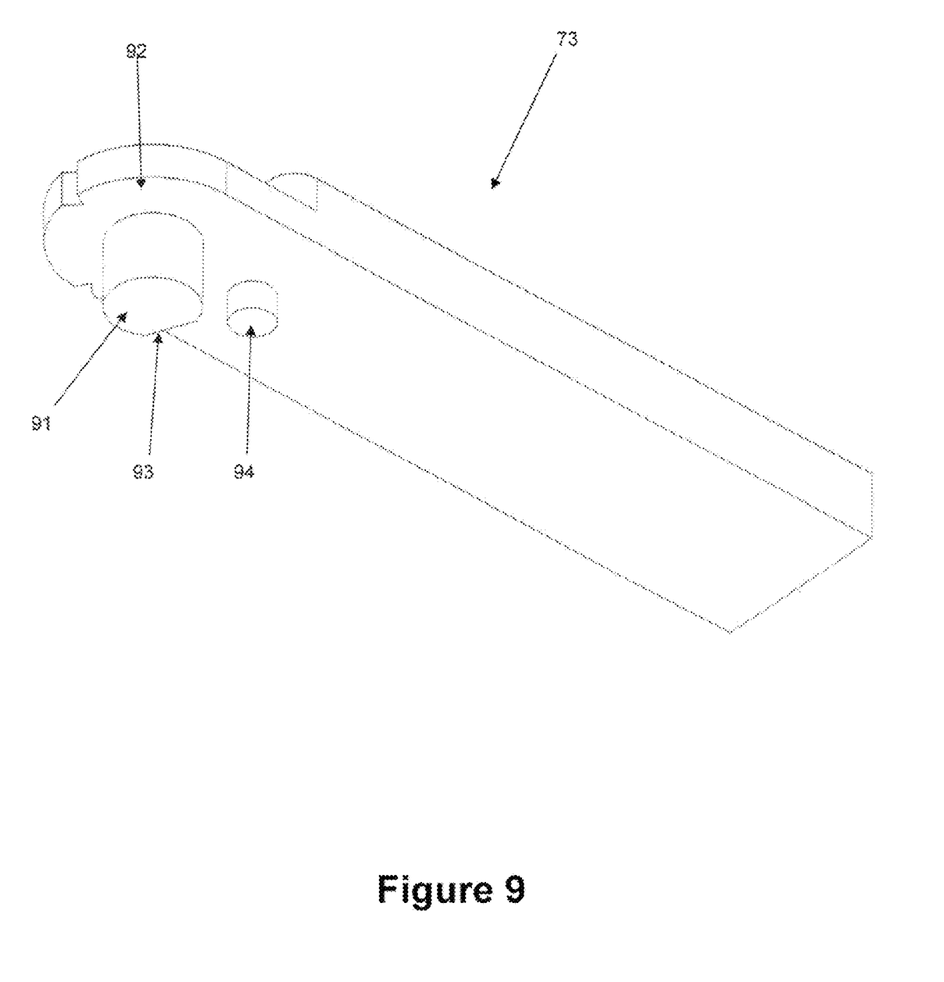
FIG. 9 is an isometric view illustration of the upper part of second hinge member illustrated in FIG. 7.
Figure 10:
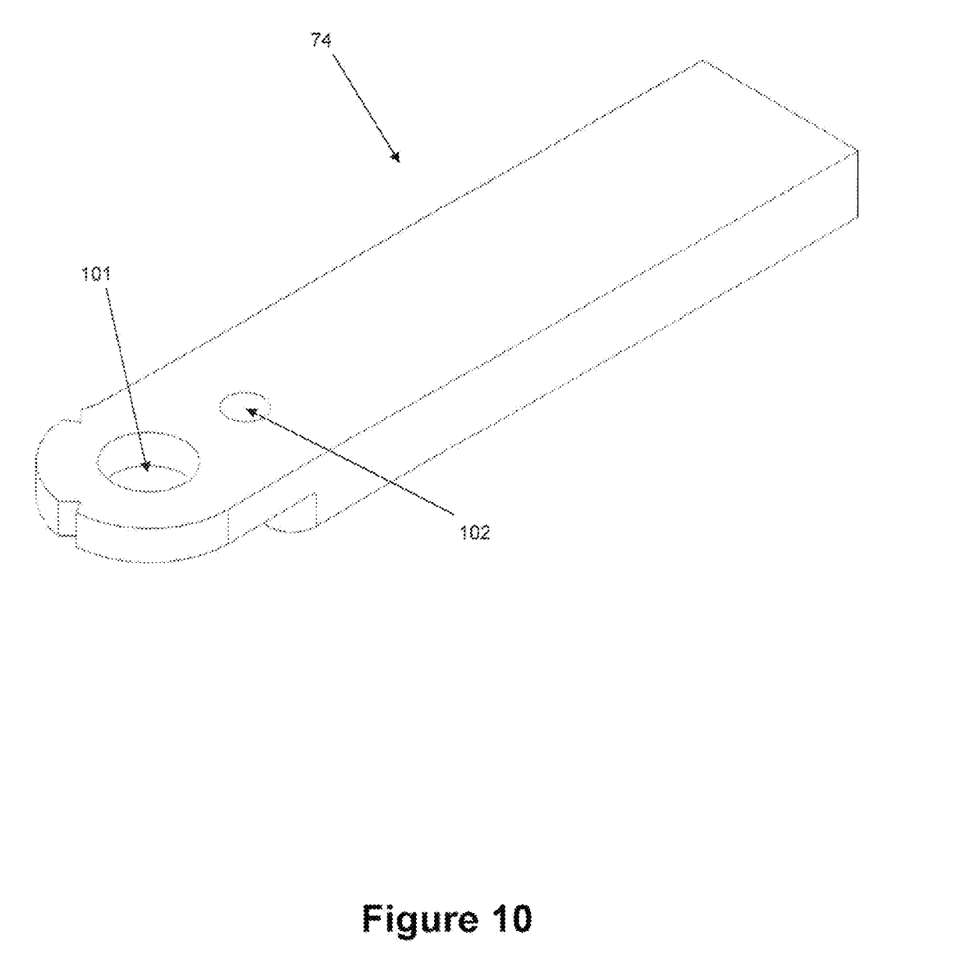
FIG. 10 is an isometric view illustration of the lower part of second hinge member illustrated in FIG. 7.

FIG. 7 is an isometric view illustration of parts of an eyeglass hinge assembly 70 according to an embodiment of the invention. Hinge assembly 70 comprises first hinge member 71 and second hinge member 72, which is separable into upper portion 73 and lower portion 74. FIGS. 8 to 10 are isometric view illustrations of first hinge member 71, upper portion 73 of second hinge member 72 and lower portion 74 of second hinge member 72, respectively.

In a preferred embodiment, first hinge member 71 is comprised as a part of an eyeglass temple arm and second hinge member 72 is comprised as part of an eyeglass frame, but in other embodiments the reverse may be the case.

Many features of the embodiment of the invention shown in FIGS. 7 to 10 are similar to those of the embodiment of the invention previously discussed. Such features will not be discussed again.

As shown clearly in FIG. 9, upper portion 73 of second hinge member 72 comprises pivot shaft 91 that extends above and below the level of limb 92 such that the lower part of the pivot shaft is adapted to pass through, and extend below, hole 101 of lower portion 74 of second hinge member 72. Pivot shaft 91 has a truncated side 93 which allows the hooked ends 75 of first hinge member 71 to enter into pivotal engagement with the shaft at a predetermined angle. As discussed previously, the dimensions of the eyeglass components are determined such that the first hinge member 71 needs to be deformed to obtain the predetermined angle.

The lack of deformation of a metallic material relative to a plastics material has led to the finding that a truncated pivot shaft 91 is move preferable than the notched pivot shaft of the earlier described embodiment when a metallic material is used.

As shown in FIG. 9, upper portion 73 may comprise a male member 94 that extends downwards from an underside of upper portion 73 and is adapted to mate with a correspondingly shaped hole 102 in lower portion 74 to join the upper and lower portions together.

Embodiments of the invention have been described above in which the temple arms are removable from the eyeglass frames when deformed, bent or moved beyond a "normal" orientation when in the closed position. Those of skill in the art will appreciate that the principles of the hinge assemblies discussed above can be applied to alternative embodiments of a hinge assembly in which temple arms are removable from the eyeglass frames when deformed, bent or moved beyond a "normal" orientation when in the open position.

Advantages of the Invention

Embodiments of the invention provide one or more advantages over the prior art, which may include:

- A temple arm is detachably connected to an eyeglass frame in such a way that it is very unlikely to become disconnected during normal use, but is easy to detach when required.
- Disconnecting a temple arm and/or parts of an eyeglass frame, including upper and lower frame parts, in a quick and easy manner means the style, shape or colour of eyeglasses can be changed to meet a wearer's needs.
- Temple arms are detachably connected to eyeglass frames in such a way that little wear is likely to occur to the parts thereof.
- An eyeglass frame may comprise upper and lower frame parts that are securely but detachably connected to temple arms such that components most vulnerable to wear are provided on those parts less likely to be subject to wear through interchanging.
- Temple arms are biased towards, or tend to stay in, one of two predetermined positions (open and closed positions). This prevents eyeglasses having "flappy" temple arms and creates a generally desirable feel to the movement of the temple arms.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. An eyeglass hinge assembly for detachably connecting a temple arm to an eyeglass frame, the temple arm being pivotably moveable through a normal motion range between open and closed positions, the eyeglass hinge assembly comprising:
    a first hinge member comprising a pivot shaft; and
    a second hinge member comprising a hooked member adapted to allow rotation of the second hinge member around the pivot shaft of the first hinge member,
    wherein the pivot shaft comprises a truncation or notch positioned to ease engagement and/or disengagement of the hooked member with the pivot shaft when the hooked member is in a predetermined orientation relative to the pivot shaft,
    wherein the position of the truncation or notch and the configuration of the hooked member are such that the predetermined orientation is, relative to the normal motion range, beyond the relative orientations of the hooked member and pivot shaft in the closed position, and
    wherein to achieve the predetermined relative orientation of the hooked member and the pivot shaft and thereby engage and/or disengage the temple arm to/from at least one frame part, a middle section of the temple arm needs to be bent towards the at least one frame part relative to an orientation of the temple arm when in the closed position,
    wherein the eyeglass frame comprises the first hinge member and the temple arm comprises the second hinge member, and
    wherein the hooked member comprises a free hook end and a straight neck section connecting the hooked member to a body of the second hinge member, the hooked member defining a channel between the free hook end and the straight neck section, the channel being configured to receive the pivot shaft when the first and second hinge members are connected, and wherein, when the first and second hinge members and connected, the straight neck section is positioned on an outer side of the eyeglass hinge assembly from the free hook end.

2. An eyeglass hinge assembly as claimed in claim 1, wherein the truncation or notch is positioned in a first side of the pivot shaft such that the truncation or notch receives an end of a first hooked member when the second hinge member is brought into engaging contact with the first hinge member, and wherein a second side of the pivot shaft is part-circular in plan view, the second side being on an opposing side of the pivot shaft to the first side.

3. An eyeglass hinge assembly as claimed in claim 1, wherein the second hinge member comprises a rotation-limiting portion.

4. An eyeglass hinge assembly as claimed in claim 3, wherein the rotation-limiting portion of the second hinge member is adapted to abut a surface of the first hinge member to limit the rotation of the temple arm and define a fully open position.

5. An eyeglass hinge assembly as claimed in claim 1, wherein the eyeglass hinge assembly comprises at least one of: a first biasing mechanism to bias the temple arm in a fully open position; and a second biasing mechanism to bias the temple arm in a fully closed position.

6. An eyeglass hinge assembly as claimed in claim 1, wherein the eyeglass frame comprises a detachable upper frame part and a detachable lower frame part, the detachable upper and lower frame parts comprising connection portions configured to allow the upper ans lower frame parts to be detached and re-attached with one another.

7. An eyeglass hinge assembly as claimed in claim 1, wherein the first hinge member comprises a limb and the pivot shaft comprises an upwardly projecting portion and a downwardly projecting portion, the upwardly and downwardly projecting portions extending upwardly and downwardly from the limb respectively, and wherein the upwardly and downwardly projecting portions each comprise a free end distal from the limb, the cross-sectional width of the upwardly and downwardly projecting portions being substantially constant between the limb and the respective free end.

8. An eyeglass hinge assembly as claimed in claim 7, wherein the upper frame part comprises the pivot shaft.

9. An eyeglass hinge assembly as claimed in claim 8, wherein the lower frame part comprises a pivot shaft receiving portion adapted to receive the downwardly projecting portion of the pivot shaft such that, when the upper and lower frame parts are connected, the pivot shaft extends downwards from the pivot shaft receiving portion.

10. An eyeglass hinge assembly as claimed in claim 9, wherein the second hinge member comprises upper and lower hooked members adapted to co-operate with the upwardly projecting portion and downwardly projecting portion of the pivot shaft respectively.

11. An eyeglass hinge assembly as claimed in claim 10, wherein the upper and lower hooked members are adapted to co-operate with the free ends of the upwardly projecting portion and downwardly projecting portion of the pivot shaft respectively.

12. A pair of eyeglasses having two temple arms and an eyeglass frame, each temple arm pivotally connected to the eyeglass frame and pivotally moveable between fully open and closed positions, each temple arm being detachably connected to the eyeglass frame by the eyeglass hinge assembly as claimed in claim 1.

13. An eyeglass temple arm adapted to be used in an eyeglass hinge assembly as claimed in claim 1, the eyeglass temple arm comprising an elongate body and a hooked member at one end of the body, the hooked member being adapted to allow rotation of the temple arm around the pivot shaft of the eyeglass frame, wherein the configuration of the hooked member is such that the hooked member may only be engaged and/or disengaged from the pivot shaft when the hooked member is in a predetermined orientation relative to the pivot shaft, wherein the configuration of the hooked member is such that the predetermined orientation is, relative to the normal motion range, beyond the relative orientations of the hooked member and pivot shaft in the closed position, and wherein to achieve the predetermined relative orientation of the hooked member and the pivot shaft and thereby engage and/or disengage the temple arm to/from the eyeglass frame, a middle section of the temple arm needs to be bent towards the eyeglass frame relative to an orientation of the temple arm when in the closed position, wherein the hooked member comprises the free hook end and the straight neck section connecting the hooked member to the elongate body, the channel being configured to receive the pivot shaft when the temple arm and eyeglass frame are connected, and wherein, when the temple arm and eyeglass frame and connected, the straight neck section is positioned on the outer side of the eyeglass hinge assembly from the free hook end.

14. An eyeglass hinge assembly for detachably connecting a temple arm to at least one frame part, the temple arm being pivotably moveable through a normal motion range between open and closed positions, the eyeglass hinge assembly comprising:

a first hinge member comprising a pivot shaft; and
a second hinge member comprising a body and at least one hooked member connected to the body, the at least one hooked member being adapted to allow rotation of the second hinge member around the pivot shaft of the first hinge member, wherein each hooked member comprises a free hook end and a straight neck section connecting the hooked member to the body,
wherein the pivot shaft comprises a truncation or notch positioned to ease engagement and/or disengagement of the at least one hooked member with the pivot shaft by movement of the pivot shaft between the free hook end and the straight neck section of each hooked member when the at least one hooked member is in a predetermined orientation relative to the pivot shaft,
wherein the position of the truncation or notch and the configuration of the hooked member are such that the predetermined orientation is, relative to the normal motion range, beyond the relative orientations of the at least one hooked member and pivot shaft in the closed position,
wherein to achieve the predetermined relative orientation of the at least one hooked member and the pivot shaft and thereby engage and/or disengage the temple arm to/from the at least one frame part, a middle section of the temple arm needs to be bent towards the at least one frame part relative to an orientation of the temple arm when in the closed position, and
wherein, in the predetermined relative orientation, moving the pivot shaft in a direction parallel to the straight neck section allows the pivot shaft and the at least one hooked member to move between fully engaged and fully disengaged positions.

15. A pair of eyeglasses having two temple arms and at least one frame part, each temple arm pivotally connected to the at least one frame part and pivotally moveable between fully open and closed positions, each temple arm being detachably connected to the at least one frame part by the eyeglass hinge assembly as claimed in claim 14.

16. An eyeglass temple arm adapted to be used in an eyeglass hinge assembly as claimed in claim 14, the eyeglass temple arm comprising an elongate body and a hooked member at one end of the body, the hooked member comprising a free hook end and a straight neck section and being adapted to allow rotation of the temple arm around the pivot shaft of the at least one frame part, wherein the configuration of the hooked member is such that the hooked member may only be engaged and/or disengaged from the pivot shaft by movement of the pivot shaft between the end and the straight section of the hooked member when the hooked member is in a predetermined orientation relative to the pivot shaft, wherein the configuration of the hooked member is such that the predetermined orientation is, relative to the normal motion range, beyond the relative orientations of the hooked member and pivot shaft in the closed position, and wherein to achieve the predetermined relative orientation of the hooked member and the pivot shaft and thereby engage and/or disengage the temple arm to/from the at least one frame part, a middle section of the temple arm needs to be bent towards the at least one frame part relative to an orientation of the temple arm when in the closed position, and wherein, in the predetermined relative orientation, moving the pivot shaft in a direction parallel to the straight neck section allows the pivot shaft and the hooked member to move between fully engaged and fully disengaged positions.

17. One or more eyeglass frame parts adapted to be used in an eyeglass hinge assembly as claimed in claim 14, the eyeglass frame parts comprising a pivot shaft, the pivot shaft comprising a truncation or notch positioned to ease engagement and/or disengagement of the at least one hooked member with the pivot shaft by movement of the pivot shaft between a free hook end and a straight neck section of the hooked member along a predetermined orientation of the at least one hooked member relative to the pivot shaft, wherein the position of the truncation or notch is such that the predetermined orientation is, relative to the normal motion range, beyond the relative orientations of the hooked member and pivot shaft in the closed position, and wherein to achieve the predetermined relative orientation of the hooked member and the pivot shaft and thereby engage and/or disengage the temple arm to/from the at least one frame part, a middle section of the temple arm needs to be bent towards the at least one frame part relative to an orientation of the temple arm when in the closed position, and wherein, in the predetermined relative orientation, moving the pivot shaft in a direction parallel to the straight neck section of the hooked member allows the pivot shaft and the hooked member to move between fully engaged and fully disengaged positions.

* * * * *